US00RE41383E

(19) United States
(12) Reissued Patent
Lee

(10) Patent Number: US RE41,383 E
(45) Date of Reissued Patent: Jun. 22, 2010

(54) METHOD AND APPARATUS FOR ENCODING INTERPLACED MACROBLOCK TEXTURE INFORMATION

(75) Inventor: Sang-Hoon Lee, Seoul (KR)

(73) Assignee: Daewoo Electronics Corp., Seoul (KR)

(21) Appl. No.: 12/131,712

(22) Filed: Jun. 2, 2008

Related U.S. Patent Documents

Reissue of:
(64) Patent No.: 6,259,732
Issued: Jul. 10, 2001
Appl. No.: 09/088,375
Filed: Jun. 2, 1998

U.S. Applications:
(63) Continuation of application No. 10/611,938, filed on Jul. 3, 2003, now abandoned.

(30) Foreign Application Priority Data

Mar. 14, 1998 (KR) ..... 98-8637

(51) Int. Cl.
*H04N 7/12* (2006.01)

(52) U.S. Cl. ..... 375/240; 375/240.01; 375/240.12; 375/240.24; 375/E7.081; 375/E7.105; 375/E7.12; 375/E7.211; 375/E7.228; 375/E7.266

(58) Field of Classification Search ..... 375/240, 375/240.01, 240.12, 240.13, 240.24, E7.081, 375/E7.105, E7.12, E7.211, E7.228, E7.266
See application file for complete search history.

(56) References Cited

U.S. PATENT DOCUMENTS 5,623,310 A * 4/1997 Kim
5,929,915 A * 7/1999 Cho ..... 375/240.13
5,991,453 A * 11/1999 Kweon et al. ..... 382/250
6,026,195 A * 2/2000 Eifrig et al. ..... 382/236
6,035,070 A * 3/2000 Moon et al. ..... 382/243
6,055,330 A * 4/2000 Eleftheriadis et al. ..... 382/154
6,069,976 A * 5/2000 Kim ..... 382/239

FOREIGN PATENT DOCUMENTS

EP 0577365 * 1/1994

* cited by examiner

*Primary Examiner*—Allen Wong
(74) *Attorney, Agent, or Firm*—Revolution IP, PLLC

(57) ABSTRACT

A method for padding interlaced texture information on a reference VOP to perform a motion estimation detects whether said each texture macroblock of the reference VOP is a boundary block or not. After the undefined texture pixels of the boundary block are extrapolated from the defined texture pixels thereof by using a horizontal repetitive padding, a transparent row padding and a transparent field padding sequentially, an undefined adjacent block is expanded based on the extrapolated boundary block.

21 Claims, 6 Drawing Sheets

METHOD AND APPARATUS FOR ENCODING INTERPLACED MACROBLOCK TEXTURE INFORMATION

Matter enclosed in heavy brackets [ ] appears in the original patent but forms no part of this reissue specification; matter printed in italics indicates the additions made by reissue.

*More than one reissue application has been filed. The reissue application Ser. No. 12/131,723, filed Jun. 2, 2008, is a continuation of the present reissue application Ser. No. 12/131,712 filed Jun. 2, 2008. The present reissue application Ser. No. 12/131,712 is a continuation of reissue application Ser. No. 10/611,938 filed Jul. 3, 2003, now abandoned, which is a reissue application of U.S. Pat. No. 6,259,732 B1, which issued on Jul. 10, 2001 from U.S. application Ser. No. 09/088,375 and which claims priority under 35 U.S.C. 119 from Korean Patent Application KR 98-8637 filed Mar. 14, 1998.*

FIELD OF THE INVENTION

The present invention relates to a method and apparatus for encoding interlaced macroblock texture information; and, more particularly, to a method and apparatus for padding interlaced texture information on a reference VOP on a texture macroblock basis in order to perform a motion estimation while using the interlaced coding technique.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

One example of object-oriented coding scheme is the so-called MPEG(Moving Picture Express Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and area surveillance(see, for instance, MPEG-4 Video Verification Model Version 7.0, International Organisation for Standardisation, ISO/IEC JTC1/SC29/WG11 MPEG97/N1642, Apr. 1997).

According to the MPEG-4, an input video image is divided into a plurality of video object planes(VOP's), which correspond to entities in a bitstream that a user can access and manipulate. A VOP can be referred to as an object and represented by a bounding rectangle whose width and height may be the smallest multiples of 16 pixels(a macroblock size) surrounding each object so that the encoder may process the input video image on a VOP-by-VOP basis, i.e., an object-by-object basis.

A VOP disclosed in the MPEG-4 includes shape information and texture information for an object therein which are represented by a plurality of macroblocks on the VOP, each of macroblocks having, e.g., 16×16 pixels, wherein the shape information is represented in binary shape signals and the texture information includes luminance and chrominance data.

Since the texture information for two input video images sequentially received has temporal redundancies, it is desirable to reduce the temporal redundancies therein by using a motion estimation and compensation technique in order to efficiently encode the texture information.

In order to perform the motion estimation and compensation, a reference VOP, e.g., a previous VOP, should be padded by a progressive image padding technique, i.e., a conventional repetitive padding technique. In principle, the repetitive padding technique fills the transparent area outside the object of the VOP by repeating boundary pixels of the object, wherein the boundary pixels are located on the contour of the object. It is preferable to perform the repetitive padding technique with respect to the reconstructed shape information. If transparent pixels in a transparent area outside the object can be filled by the repetition of more than one boundary pixel, the average of the repeated values is taken as a padded value. This progressive padding process is generally divided into 3 steps: a horizontal repetitive padding; a vertical repetitive padding and an exterior padding (see, MPEG-4 Video Verification Model Version 7.0)

While the progressive padding process as described above may be used to encode progressive texture information which has a larger spacial correlation between rows on a macroblock basis, the coding efficiency thereof may be low if the motion of an object within a VOP or a frame is considerably large. Therefore, prior to performing the motion estimation and compensation on a field-by-field basis for an interlaced texture information with the fast movement such as a sporting event, horse racing and car racing, an interlaced padding process may be preferable to the progressive padding process, wherein in the interlaced padding process a macroblock is divided into two field blocks and padding is carried out on a field block basis.

However, if all field blocks are padded without considering their correlation between fields, certain field blocks may not be properly padded.

SUMMARY OF THE INVENTION

It is, therefore, an object of the invention to provide a method and apparatus capable of padding the interlaced texture information considering its correlation between fields.

In accordance with the invention, there is provided a method for encoding interlaced texture information on a texture macroblock basis through a motion estimation between a current VOP and its one or more reference VOP's, wherein each texture macroblock of the current and the reference VOP's has M×N defined or undefined texture pixels, M and N being positive even integers, respectively, the method comprising the steps of:

(a) detecting whether said each texture macroblock of each reference VOP is a boundary block or not, wherein the boundary block has at least one defined texture pixel and at least one undefined texture pixel;

(b) dividing the boundary block into two field blocks, each field block having M/2×N texture pixels;

(c) extrapolating the undefined texture pixels of each field block based on the defined texture pixels thereof to generate an extrapolated boundary block for said two field blocks; and (d) if the boundary block has an undefined field block and a defined field block, padding the undefined field block based on the defined field block, wherein the undefined field block and the defined field block represent one field block having the undefined texture pixels only and the other field block having at least one defined texture pixel, respectively.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
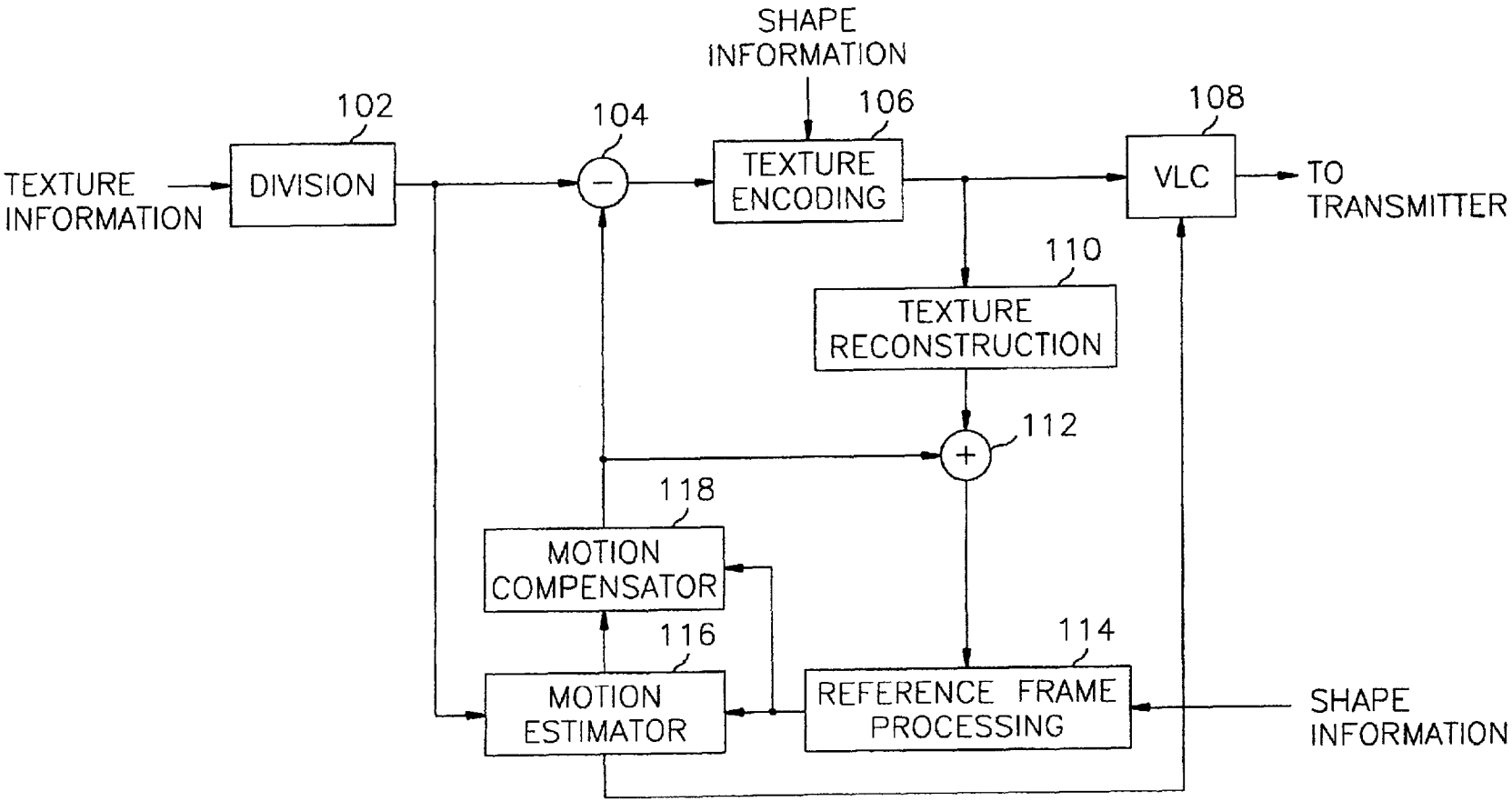
FIG. 1 shows a schematic block diagram of an apparatus for encoding interlaced texture information of an object in a video signal in accordance with the present invention.

Referring to FIG. 1, there is shown a schematic block diagram of an apparatus for encoding texture information on a current VOP. The texture information partitioned into a plurality of texture macroblocks is applied to a division circuit 102 on a texture macroblock basis, wherein each texture macroblock has M×N texture pixels, M and N being positive even integers typically ranging between 4 and 16.

The division circuit 102 divides each texture macroblock into a top and a bottom field blocks which may be referred to as interlaced texture information, wherein the top field block having M/2×N texture pixels contains every odd row of each texture macroblock and the bottom field block having the other M/2×N texture pixels contains every even row of each texture macroblock. The top and the bottom field blocks for each texture macroblock are sequentially provided as a current top and a current bottom field blocks, respectively, to a subtractor 104 and a motion estimator 116.

Reference, e.g., previous interlaced texture information, i.e., interlaced texture information of a reference VOP, is read out from a reference frame processing circuit 114 and provided to the motion estimator 116 and a motion compensator 118. The reference VOP is also partitioned into a plurality of search regions and each search region is divided into a top and a bottom search regions, wherein the top search regions having a predetermined number, e.g., P(M/2×N) of reference pixels contains every odd row of each search region of the bottom search region having the predetermined number of reference pixels contains every even row of each search region, P being a positive integer, typically, 2.

The motion estimator 116 determines a motion vector for each current top or bottom field block on a field-by-field basis. First, the motion estimator 116 detects two reference field blocks, i.e., a reference top and a reference bottom field blocks for each current top or bottom field block, wherein the two reference field blocks within the top and bottom search regions, respectively, are located at a same position as each current top or bottom field block. Since the top and the bottom search regions have a plurality of candidate top and candidate bottom field blocks including the reference top and the reference bottom field blocks, respectively, each current top or bottom field can be displaced on a pixel-by-pixel basis within the top and the bottom search regions to correspond with a candidate top and a candidate bottom field blocks for each displacement, respectively; at all possible displacements, errors between each current top or bottom field block and all candidate top and bottom field blocks therefore are calculated to be compared with one another; and selects, as an optimum candidate field block or a most similar field block, a candidate top or bottom field block which yields a minimum error. Outputs from the motion estimator 116 are a motion vector and a field indication flag being provided to the motion compensator 118 and a statistical coding circuit 108 by using, e.g., a variable length coding(VLC) discipline, wherein the motion vector denotes a displacement between each current top or bottom field block and the optimum candidate field block and the field indication flag represents whether the optimum candidate field block belongs, to the top search region or not.

The motion compensator 118 provides the optimum candidate field block as a predicted top or bottom field block for each current top or bottom field block based on the motion vector and the field indication flag to the subtractor 104 and an adder 112.

The subtractor 104 obtains an error field block by subtracting the predicted top or bottom field block from each current top or bottom field block on a corresponding pixel-by-pixel basis, to provide the error field block to a texture encoding circuit 106.

In the texture encoding circuit 106, the error field block is subjected to an orthogonal transform for removing spatial redundancy thereof and then transform coefficients are quantized, to thereby provide the quantized transform coefficients to the statistical coding circuit 108 and a texture reconstruction circuit 110. Since a conventional orthogonal transform such as a discrete cosine transform(DCT) is performed on a DCT block-by-DCT block basis, each DCT block having typically 8×8 texture pixels, the error field block having 8×16 error texture pixels may be preferably divided into two DCT blocks in the texture encoding circuit 106. If necessary, before performing the DCT, each error field block may be DCT-padded based on the shape information or the reconstructed shape information of each VOP in order to reduce higher frequency components which may be generated in the DCT processing. For example, a predetermined value, e.g., '0', may be assigned to the error texture pixels at the exterior of the contour in each VOP.

The statistical coding circuit 108 performs a statistical encoding on the quantized transform coefficients fed from the texture encoding circuit 106 and the field indication flag and the motion vector, for each current top or bottom field block, fed from the motion estimator 116 by using, e.g., a conventional variable length coding technique, to thereby provide statistically encoded data to a transmitter (not shown) for the transmission thereof.

In the meantime, the texture reconstruction circuit 110 performs an inverse quantization and inverse transform on the quantized transform coefficients to provide a reconstructed error field block, which corresponds to the error field block, to the adder 112. The adder 112 combines the reconstructed error field block from the texture reconstruction circuit 110 and the predicted top or bottom field block from the motion compensator 118 on a pixel-by-pixel basis, to thereby provide a combined result as a reconstructed top or bottom field block for each current top or bottom field block to the reference frame processing circuit 114.

The reference frame processing circuit 114 sequentially pads the reconstructed top or bottom field block based on the shape information or the reconstructed shape information for the current VOP, to thereby store the padded top and bottom field blocks as another reference interlaced texture information for a subsequent current VOP to the motion estimator 116 and the motion compensator 118.

Figure 2:
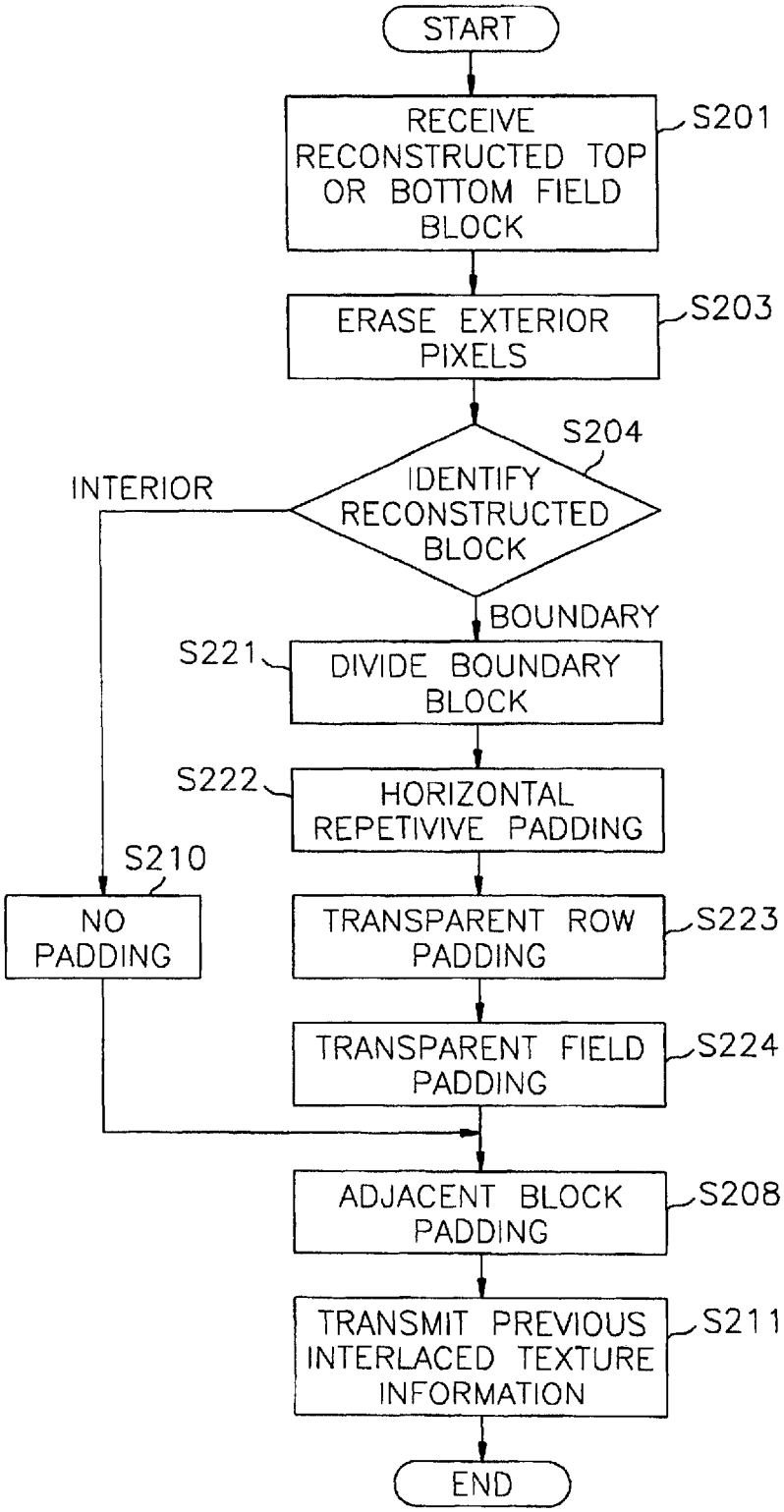
FIG. 2 presents a flow chart for illustrating the operation of the reference frame processing circuit shown in FIG. 1.

Referring to FIG. 2, there is a flow chart for illustrating the operation of the reference frame processing circuit 114 shown in FIG. 1.

At step S201, the reconstructed top or bottom field block is sequentially received and, at step S203, exterior pixels in the reconstructed top or bottom field block are eliminated based on the shape information, wherein the exterior pixels are located at the outside of the contour for the object. The reconstructed shape information may be used on behalf of the shape information. While the exterior pixels are eliminated to be set as transparent pixels, i.e., undefined texture pixels, the remaining interior pixels in the reconstructed top or bottom field block are provided as defined texture pixels on a field block-by-field block basis.

At step S204, each reconstructed block having a reconstructed top and its corresponding reconstructed bottom field blocks is determined whether or not being traversed by the contour of the object. In other words, each reconstructed block is determined as an interior block, a boundary block, or an exterior block, wherein the interior block has only the defined texture pixels, the exterior block has only the undefined texture pixels and the boundary block has both the defined texture pixels and the undefined texture pixels. If the reconstructed block is determined as an interior block, at step S210, no padding is performed and the process goes to step S208.

Figure 3A:
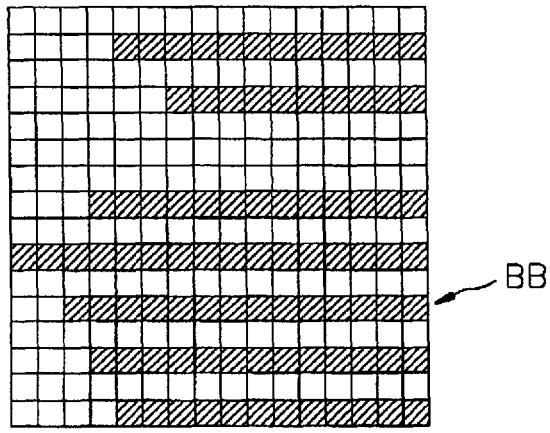
FIGS. 3A and 3B describe an exemplary boundary macroblock and a top and a bottom boundary field blocks for the boundary macroblock, respectively.

If the reconstructed block is a boundary block BB as shown in FIG. 3A, at steps S221 to S224, the undefined texture pixels of the boundary block are extrapolated from the defined texture pixels thereof to generate an extrapolated boundary block, wherein each of squares is a texture pixel, each shaded square being a defined texture pixel and each white one being a undefined texture pixel.

Figure 3B:
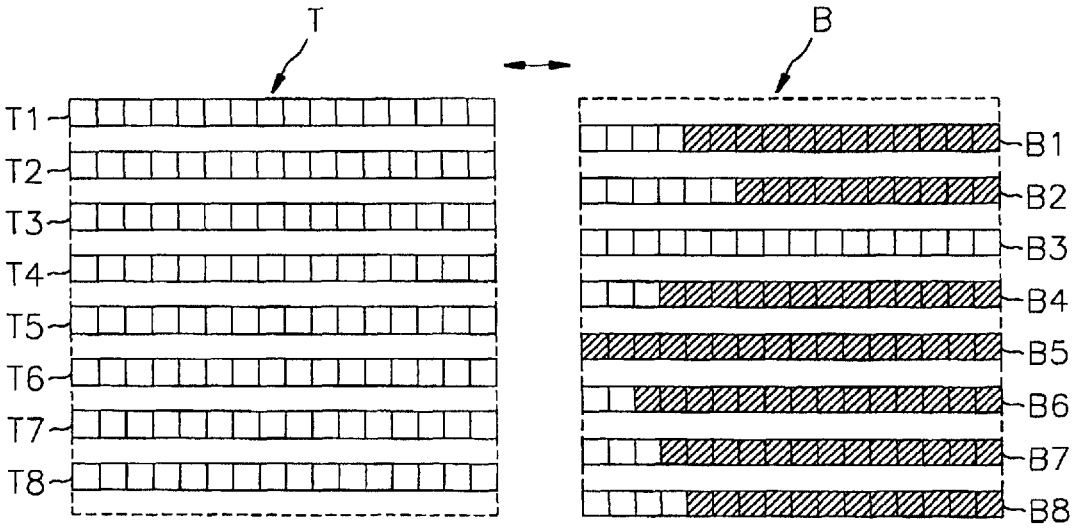

First, at step S221, the boundary block is divided into a top and a bottom boundary field blocks T and B as shown in FIG. 3B, wherein each boundary field block has M2×N texture pixels, i.e., 8×16 texture pixels so that the top and the bottom field blocks T and B have M/2, i.e., 8 rows T1 to T8 and B1 to B8, respectively.

Figure 3C:
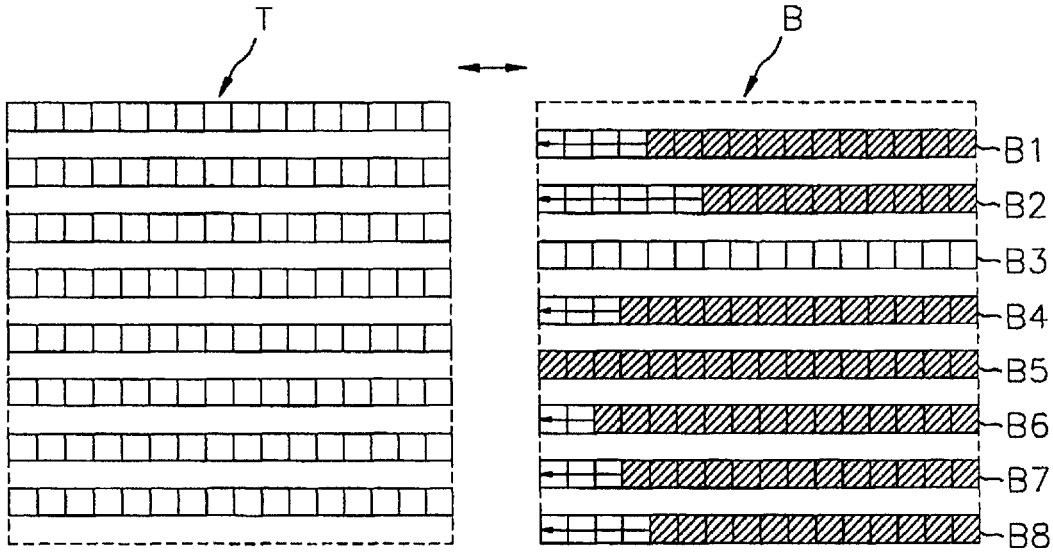
FIGS. 3C to 3E represent a padding procedure of the top and the bottom boundary field blocks sequentially in accordance with the present invention.

At step S222, the undefined texture pixels are padded on a row-by-row basis by using a horizontal repetitive padding technique as shown in FIG. 3C to generate a padded row for each of rows B1, B2 and B4 to B8. In other words, the undefined texture pixels are filled by repeating boundary pixels toward the arrows as shown in FIG. 3C, wherein each boundary pixel among the defined texture pixels is located on the contour, i.e., the border, of the object. If there exist undefined texture pixels which may be padded by the repetition of more than one boundary pixel, the average value of the repeated values is used.

Figure 3D:
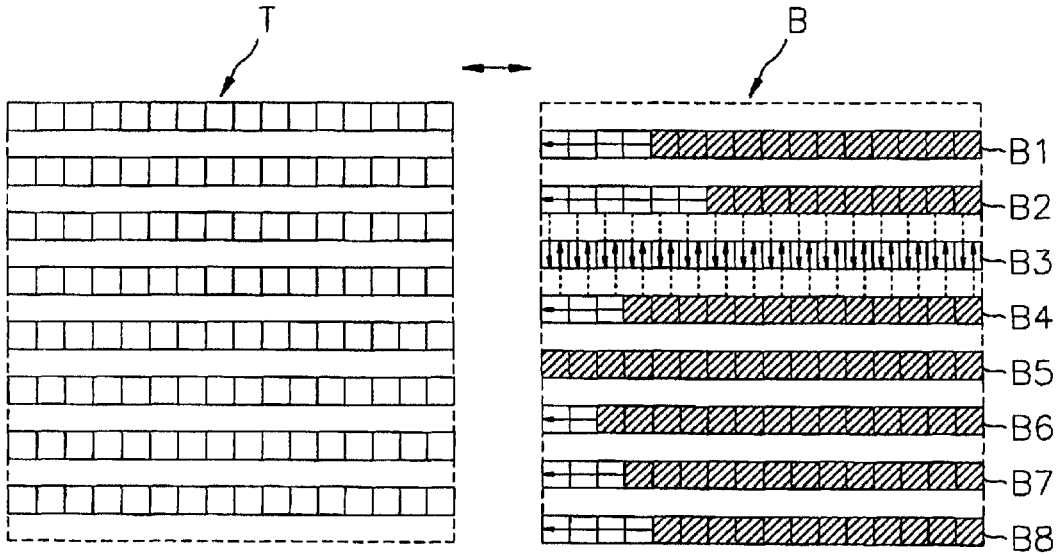

If there exist one or more transparent rows, having the undefined texture pixels only, on each top or bottom field block, at step S223, each transparent row is padded by using one or more nearest defined or padded rows among the corresponding top or bottom field block, wherein the defined row has all the defined texture pixels therein. For example, as shown in FIG. 3D, each undefined texture pixel of the transparent row B3 shown in the bottom field block is padded with an average of two defined or padded texture pixels based on a nearest upward and a nearest downward padded rows, i.e., the 2nd and the 4th padded rows B2 and B4 in the bottom field block B. If the transparent row is located at the highest or the lowest row, i.e., corresponds to the 1st row 1 or the 8th row, each texture pixel is padded with a defined or padded texture pixel of the nearest padded or defined row.

Figure 3E:
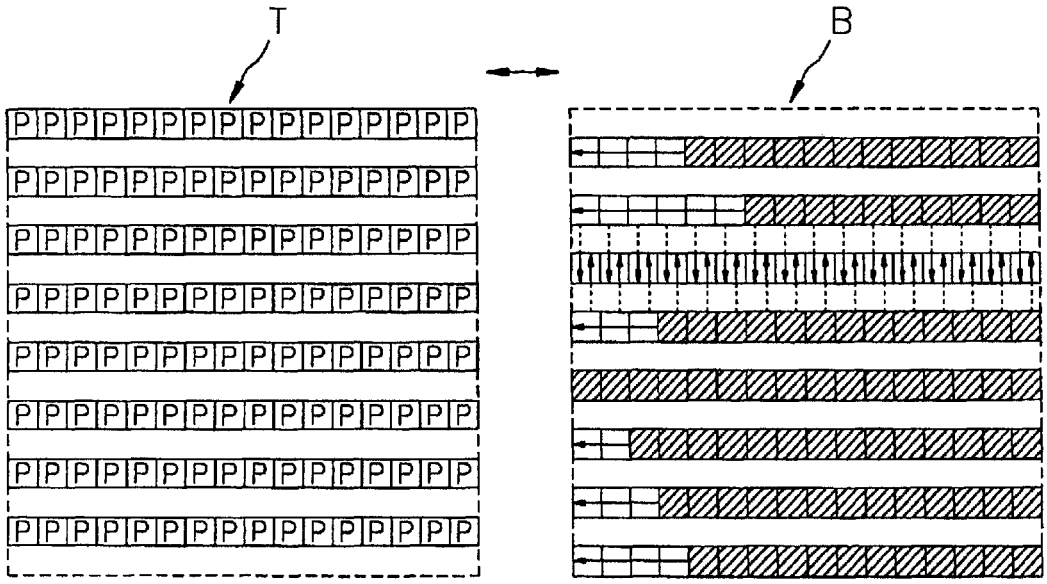

If there exists one transparent boundary field block in the boundary block as shown in FIG. 3B, at step S224, the transparent boundary field block is padded based on the other boundary field block of the boundary block, wherein the transparent boundary field block, i.e., an undefined field block has no defined texture pixel therein. In other words, if a top field block is transparent, all the undefined texture pixels thereof may be padded with a constant value P as shown in FIG. 3E, e.g., a mean value of the defined texture pixels within the bottom field block. The mean value of both the defined and the padded pixels within the bottom field block can also be used to fill the transparent field block. If necessary, a middle value $2_{L-1}$ of all the possible values for any texture pixel may be used based on the channel characteristics, wherein L is the number of bits assigned for each pixel. For example, if L is equal to 8, there are 256 texture pixels 0 to 255 and the middle value is determined to be 128.

Figure 4:
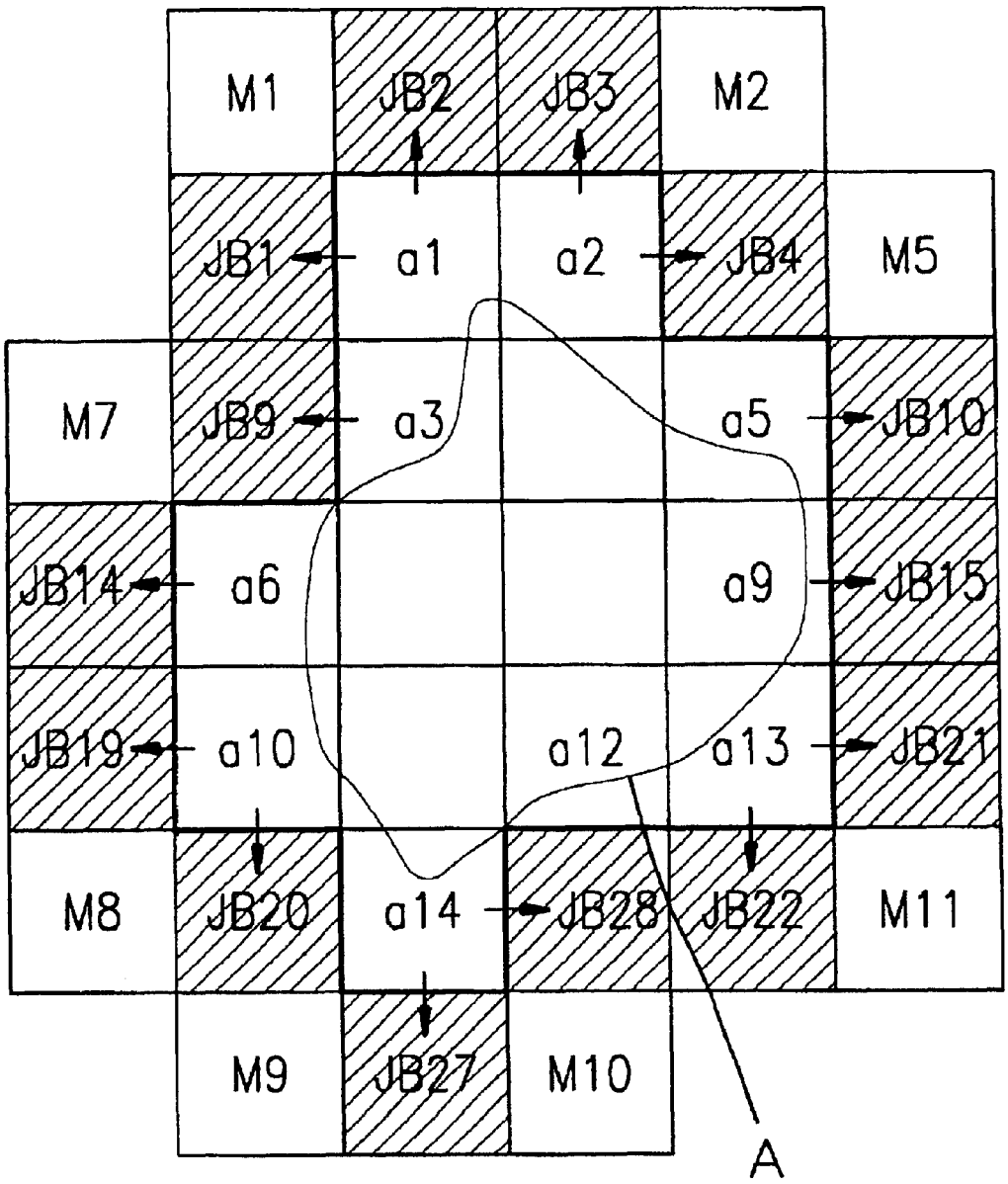
FIG. 4 depicts a plurality of undefined adjacent blocks for an exemplary VOP and the padding directions for each undefined adjacent block.

After all the interior and boundary blocks are padded as described above, in order to cope with a VOP of fast motion, the padding must be further extended to undefined adjacent blocks, i.e., exterior blocks which are adjacent to one or more interior or boundary blocks. The adjacent blocks can stretch outside the VOP, if necessary. At step S208, the undefined texture pixels in the undefined adjacent block are padded based on one of the extrapolated boundary blocks and the interior blocks to generate an extrapolated adjacent block for the undefined adjacent block, wherein each extrapolated boundary block has a part of the contour A of an object and each undefined adjacent block is shown as a shaded region as shown in FIG. 4. If more than one extrapolated boundary blocks surround the undefined adjacent block, one of the left, the upper, the right and the below extrapolated boundary blocks of the undefined adjacent block is selected in this priority and, then, a vertical or a horizontal border of the selected extrapolated boundary block is repeated rightwards, downwards, leftwards or upwards, wherein the vertical or the horizontal border adjoins the undefined adjacent block. As shown in FIG. 4, the undefined adjacent blocks JB4, JB10, JB15, JB21 and JB28 select their respective left extrapolated boundary blocks a2, a5, a9, a13 and a14; the undefined adjacent blocks JB20, JB27 and JB22 select their respective upper extrapolated boundary blocks a10, a14 and a13; the undefined adjacent blocks JB1, JB9, JB14 and JB19 select their respective right extrapolated boundary blocks a1, a3, a6 and a10; and the undefined adjacent blocks JB2 and JB3 select their respective below extrapolated boundary blocks a1 and a2. A rightmost vertical border of the extrapolated boundary block a2 is expanded rightward to fill the undefined adjacent block JB4, a lowermost horizontal border of the extrapolated boundary block a10 is expanded downward to fill the undefined adjacent block JB20 and so on. Also, undefined diagonal blocks such as M1, M2, MS and M7 to M11 may be padded with a constant value, e.g., '128' to be the extrapolated adjacent block for the undefined diagonal block, wherein each undefined diagonal block is diagonally adjacent to the extrapolated boundary block and has all undefined texture pixels.

As described above, at step S211, the extrapolated boundary and the extrapolated adjacent blocks as well as the interior blocks are stored.

While the present invention has been described with respect to the particular embodiments, it will be apparent to those skilled in the art that various changes and modifications may be made without departing from the spirit and scope of the invention as defined in the following claims.

What is claimed is:

1. A method for encoding interlaced texture information on a texture macroblock basis through a motion estimation between a current VOP and its one or more reference VOP's, wherein each texture macroblock of the current and the reference VOP's has M×N defined or undefined texture pixels, M and N being positive even integers, respectively, the method comprising the steps of:

(a) detecting whether said each texture macroblock of each reference VOP is a boundary block or not, wherein the boundary block has at least one defined texture pixel and at least one undefined texture pixel;

(b) dividing the boundary block into two field blocks, each field block having M/2×N texture pixels;

(c) extrapolating the undefined texture pixels of each field block based on the defined texture pixels thereof to generate an extrapolated boundary block for said two field blocks;

(d) if the boundary block has an undefined field block and a defined field block, padding the undefined field block based on the defined field block, wherein the undefined field block and the defined field block represent one field block having the undefined texture pixels only and the other field block having at least one defined texture pixel, respectively; and (f) expanding an undefined adjacent block based on the extrapolated boundary block, wherein the undefined adjacent block is adjacent to the extrapolated boundary block and has only undefined texture pixels, wherein the step (c) further includes the step of (c1) field-padding said at least one undefined texture pixel in a field block from said at least one defined texture pixel therein, to thereby generate a padded field block for the field block, wherein the step (c1) has the steps of:

(c11) row-padding said at least one undefined texture pixel on a row-by-row basis to generate a padded row; and (c12) padding, if there exists a transparent row, the transparent row from at least one nearest padded row, wherein the transparent row represents a row having the undefined texture pixels only.

2. The method as recited in claim 1, wherein said step (f) includes the steps of:

(f1) selecting, if said undefined adjacent block is surrounded by a plurality of extrapolated boundary blocks, one of the left, the upper, the right and the below extrapolated boundary blocks of said undefined adjacent block in this priority; and (f2) replicating a vertical or a horizontal border of the selected extrapolated boundary block rightwards, downwards, leftwards or upwards, to thereby expand the undefined adjacent block, wherein the vertical or the horizontal border adjoins said undefined adjacent block.

3. The method as recited in claim 1, wherein all the undefined texture pixels of said undefined field block are padded with a constant value.

4. The method as recited in claim 3, wherein all the undefined texture pixels of said undefined field block are padded with a mean value of both the defined texture pixels and padded texture pixels within the padded field block for the other field block, wherein the padded texture pixels are field-padded through the step (c1).

5. The method as recited in claim 3, wherein all the undefined texture pixels of said undefined field block are padded with a mean value of the defined texture pixels within the padded field block for the other field block.

6. The method as recited in claim 3, wherein the constant value is $2^{L-1}$, wherein L is the number of bits assigned for each pixel.

7. The method as recited in claim 6, wherein L is 8.

8. An apparatus for encoding interlaced texture information on a texture macroblock basis through a motion estimation between a current VOP and its one or more reference VOP's, wherein each texture macroblock of the current and reference VOP's has M×N texture pixels, M and N being positive even integers, respectively, the apparatus comprising:

a boundary block detector for detecting whether said each texture macroblock of each reference VOP is a boundary block or not, wherein the boundary block has at least one defined texture pixel and at least one undefined texture pixel;

a field divider for dividing the boundary block into two field blocks, each field block having M/2×N texture pixels;

a texture pixel padding circuit for extrapolating the undefined texture pixels of each field block based on the defined texture pixels thereof to generate an extrapolated boundary block for said two field blocks;

a transparent field padding circuit for padding an undefined field block of the boundary block based on the other field block thereof, wherein the undefined field block represents a field block having the undefined texture pixels only;

an adjacent block padding circuit for expanding an undefined adjacent block based on the extrapolated boundary block, wherein the undefined adjacent block is adjacent to the extrapolated boundary block and has the undefined texture pixels only; and a field-padding circuit for field-padding the undefined texture pixels in a field block from the defined texture pixels therein, to thereby generate a padded field block for the field block, wherein the field-padding circuit includes:

a horizontal padding circuit for padding the undefined texture pixels on a row-by-row basis to generate a padded row; and a transparent row padding circuit for padding the transparent row from at least one nearest padded row, wherein the transparent row represents a row having the defined texture pixels only.

9. The apparatus as recited in claim 8, wherein said adjacent block padding circuit includes:

a selector for selecting one of the left, the upper, the right and the below extrapolated boundary blocks of said undefined adjacent block in this priority; and means for replicating a vertical or a horizontal border of the selected extrapolated boundary block rightwards, downwards, leftwards or upwards, to thereby expand the undefined adjacent block, wherein the vertical or the horizontal border adjoins said undefined adjacent block.

10. The apparatus as recited in claim 8, wherein all the undefined texture pixels of said undefined field block are padded with a constant value.

11. The apparatus as recited in claim 10, wherein all the undefined texture pixels of said undefined field block are padded with a mean value of both the defined texture pixels and padded texture pixels within the padded field block for the other field block, wherein the padded texture pixels are field-padded through the field-padding circuit.

12. The apparatus as recited in claim 10, wherein all the undefined texture pixels of said undefined field block are padded with a mean value of the defined texture pixels within the padded field block for the other field block.

13. The apparatus as recited in claim 10, wherein the constant value is $2^{L-1}$, L being the number of bits assigned for each pixel.

14. The apparatus as recited in claim 13, wherein L is 8.

*15. A method for encoding interlaced texture information on a texture macroblock basis using a field prediction between a current VOP and its one or more reference VOP's, wherein the texture macroblock of the current VOP has M×N defined or undefined texture pixels, M and N being positive integers, respectively, the method comprising:*

*providing top field block or bottom field block of the texture macroblock of the current VOP;*

*determining a motion vector and a predicted top or bottom field block for each current top or bottom field block on a field-by-field basis, wherein the motion vector denotes a displacement between each current top or bottom field block and the predicted top or bottom field block of the reference VOP;*

*obtaining an error field block by subtracting the predicted top or bottom field block from each current top or bottom field block on a corresponding pixel-by-pixel basis;*

*discrete-cosine-transforming the error field block on a DCT block-by-DCT block basis;*

*quantizing the DCT coefficients; and*

*performing a statistical encoding on the quantized DCT coefficients and motion vector, for each top or bottom field block,*

*wherein the reference VOP is obtained by padding the previous reconstructed texture information based on shape information,*

*wherein when the previous reconstructed texture information is a boundary macroblock of interlaced VOP, (i) the undefined texture pixel in a row of the macroblock of interlaced VOP is padded based on one or more of the defined texture pixels in said row, (ii) the undefined texture pixels in a row having only the undefined texture pixels are padded based on one or more of the defined texture pixels in another one or more rows having at least one defined texture pixel in same field block, and (iii) the field block has only the undefined texture pixels is padded with a constant value.*

*16. The method of claim 15, wherein the constant value is $2^{L-1}$, wherein L is a number of bits assigned for each pixel.*

*17. The method of claim 15, wherein the constant value is 128.*

*18. A method for encoding interlaced texture information on a texture macroblock basis using a field prediction between a current VOP and its one or more reference VOP's, wherein the texture macroblock of the current VOP has M×N defined or undefined texture pixels, M and N being positive integers, respectively, the method comprising:*

*providing top field block or bottom field block of the texture macroblock of the current VOP;*

*determining a motion vector and a predicted top or bottom field block for each current top or bottom field block on a field-by-field basis, wherein the motion vector denotes a displacement between each current top or bottom field block and the predicted top or bottom field block of the reference VOP;*

*obtaining an error field block by subtracting the predicted top or bottom field block from each current top or bottom field block on a corresponding pixel-by-pixel basis;*

*discrete-cosine-transforming the error field block on a DCT block-by-DCT block basis;*

*quantizing the DCT coefficients;*

*performing a statistical encoding on the quantized DCT coefficients and motion vector, for each top or bottom field block;*

*performing an inverse quantization and inverse transform on the quantized DCT coefficients to obtain a reconstructed error field block;*

*combining the reconstructed error field block and the predicted top or bottom field block on a pixel-by-pixel basis; and*

*padding a reconstructed top or bottom field block based on shape information for the current VOP, to thereby store the padded top or bottom field blocks as reference interlaced texture information,*

*wherein the step of padding a reconstructed top or bottom field block further includes the substeps of:*

*padding the undefined texture pixel of the reconstructed boundary top or bottom field block based on one or more the defined texture pixels in same field block,*

*if the boundary top or bottom field block has only undefined texture pixels, padding the undefined texture pixels with middle value $2^{L-1}$ of all the possible values for any texture pixel,*

*expanding an undefined adjacent macroblock based on the padded boundary macroblock, wherein the undefined adjacent macroblock is adjacent to the padded boundary macroblock and has only undefined texture pixels.*

*19. The method of claim 18, wherein the substep of padding the undefined texture pixel of the reconstructed boundary top or bottom field block includes the steps of;*

*row-padding at least one undefined texture pixel on a row-by-row basis to generate a padded row, and*

*padding, if there exist one or more transparent rows, the transparent row based on at least one nearest padded row, wherein the transparent row has only the undefined textures.*

*20. The method of claim 18, wherein the substep of expanding an undefined adjacent macroblock based on the padded boundary macroblock includes the steps of;*

*selecting, if said undefined adjacent block is surrounded by a plurality of padded boundary macroblocks, one of the left, the upper, the right and the below extrapolated boundary macroblocks of said undefined adjacent macroblock in this priority, and*

*replicating a vertical border or a horizontal border of the selected padded boundary macroblock rightwards, downwards, leftwards or upwards.*

*21. The method of claim 18, wherein middle value $2^{L-1}$ of all the possible values for any texture pixel is 128.*

* * * * *